United States Patent Office 2,814,602
Patented Nov. 26, 1957

2,814,602

PLASTICIZED VINYL POLYMERS CONTAINING ALKOXYCHLOROBENZENES

Gordon K. Storin, Niagara Falls, N. Y., and Francis E. Lawlor, Philadelphia, Pa., and Ferri Casciani, Lewiston, N. Y., assignors, by mesne assignments, to Hooker Electrochemical Company, Niagara Falls, N. Y., a corporation of New York No Drawing. Application January 20, 1954,
Serial No. 405,261

18 Claims. (Cl. 260—30.6)

This invention relates to vinyl chloride polymers plasticized with a primary plasticizer and as a secondary plasticizer an alkoxychlorobenzene.

Vinyl chloride polymers and copolymers thereof with minor proportions of other vinyl compounds can be prepared to have a wide variety of properties, but in general it can be said that these polymers have a high tensile and flexural strength and a low percentage of elongation. The polymers usually are quite hard. In modulus of elongation, unplasticized polyvinyl chloride is not greatly different from polystyrene and nitrocellulose.

Plasticizers are incorporated in vinyl chloride polymers in order to increase elongation and pliability. At low plasticizer concentration tensile strengths as high as 9000 p. s. i. have been observed, not greatly different from the unplasticized resin, and the elongation is greatly increased. With increasing plasticizer content the percent elongation at break continues to increase but the tensile strength decreases. With large proportions of plasticizer elongations up to 500% have been obtained, but the tensile strength may be reduced by as much as two-thirds. At the same time the plasticized resin is quite pliable.

Because the hardness and modulus of elongation of vinyl chloride polymers can be controlled by the proportions of plasticizer these resins in the plasticized forms have found widespread application in the fields of electric wire and cable coverings, pliable thin sheeting and film finishing for textiles. For wire coating about 30% or less plasticizer is used, and the material is extruded directly around the wire. In order to minimize fire hazards, however, vinyl chloride wire coatings should be nonflammable. Nonflammability also is desirable in the production of sheeting and film finishes for textiles. While many plasticized vinyl chloride polymers can be characterized as flame-resistant, in some instances, such as when di-2-ethylhexylphthalate is employed as the plasticizer, the composition will continue to burn after removal from a flame. Even the flame resistance of a vinyl polymer plasticized with di-2-ethylhexylphthalate and a chlorinated paraffin leaves much to be desired.

It is known that highly halogenated materials are capable of imparting improved flame resistance to synthetic resins. However, such materials cannot always be employed with vinyl polymers because they are noncompatible therewith. Di-2-ethylhexyl tetrachlorophthalate, for example, is capable of producing a nonflammable vinyl polymer composition, but this material exudes excessively from the final composition.

Alkoxychlorobenzenes are known compounds and have been described in the literature. They are highly chlorinated and can be prepared in various ways. A good commercial method is by the condensation of the corresponding chlorobenzene and alcohol in the presence of sodium hydroxide. U. S. Patent No. 2,578,853 to Stevenson, dated December 18, 1951, claims these compounds as satisfactory plasticizers for synthetic rubbers, but points out at column 4, lines 24 to 28, that these materials are incompatible with representative vinyl resins, and this fact has been verified by independent experimentation.

In accordance with the instant invention it has been determined that certain alkoxychlorobenzenes when used in combination with conventional primary plasticizers for vinyl chloride polymers are compatible therewith and are capable of imparting an enhanced flame resistance and other properties to the final composition. The alkoxychlorobenzenes which are employed as secondary plasticizers in this invention have the general formula

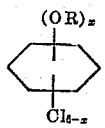

where R is a straight or branched chain alkyl radical having from four to eight carbon atoms, and $x$ is one or two. Those ethers having less than four carbon atoms in the alkoxy group are too volatile and are not retained in the vinyl chloride polymer during incorporation of the plasticizer. Those with more than eight carbon atoms in the alkoxy group are not compatible with the vinyl resin even in the presence of the primary plasticizer. The monoalkoxyethers have a higher chlorine content and therefore are preferred, because they are capable of imparting a higher flame resistance. Furthermore, the monoethers are more compatible with the vinyl chloride polymers.

In addition to imparting an improved flame resistance, these ethers give a tougher vinyl composition.

The following descriptive procedures show how to prepare two mixtures of alkoxychlorobenzenes employed in vinyl polymer compositions with a primary plasticizer in accordance with the invention:

EXAMPLE A 6 moles of hexachlorobenzene, 12 moles of sodium hydroxide and 27 moles of butanol were placed in a suitable reaction vessel and heated at atmospheric pressure. The preheating period required 0.7 hour to heat the mixture to a temperature of 114°–115° C. at which temperature it was maintained for 1 hour following which the mixture was cooled over a period of 0.6 hour. Based on distillation temperatures and chlorine analysis the product was found to contain 92.4% monobutoxypentachlorobenzene and 7.6% dibutoxytetrachlorobenzene.

EXAMPLE B 5 moles of hexachlorobenzene, 30 moles of sodium hydroxide and 67.5 moles of butanol were placed in a reaction vessel and heated to a temperature of 117°–123° C. for 7 hours, utilizing the preheating and cooling schedule in Example A. Based on analysis by distillation and chlorine content, the product was found to contain 82.8% dibutoxytetrachlorobenzene and 17.2% monobutoxypentachlorobenzene.

From a comparison of Examples A and B it will be noted that the extent of the substitution of the chlorine atom by the butoxy radical is a function of the proportions of the reacting components to the reaction time and the temperature of the reaction. Increased amounts of sodium hydroxide and butanol, together with a longer reaction time and higher temperature, favor the formation of the higher substituted compound. By adjusting these variables, a product can be made consisting almost entirely of the mono compound or the di compound.

The reaction products can be used as mixtures or can be separated by fractional distillation under reduced pressure and the compounds used separately.

Exemplary of other operative alkoxychlorobenzenes which can be used separately or in admixture are monobutoxypentachlorobenzene, dibutoxytetrachlorobenzene, monoisobutoxypentachlorobenzene, n-butoxyisobutoxytetrachlorobenzene, diisobutoxytetrachlorobenzene, n-amoxypentachlorobenzene, isoamoxypentachlorobenzene, diamoxytetrachlorobenzene, ethylhexoxypentachlorobenzene, n-octoxypentachlorobenzene, di-n-octoxytetrachlorobenzene, di-n-heptoxytetrachlorobenzene, n-heptoxypentachlorobenzene, n-hexoxypentachlorobenzene, diisohexoxytetrachlorobenzene, and diisoheptoxytetrachlorobenzene.

These substances are inert both to vinyl polymers and to the primary plasticizers conventionally used with such polymers.

This invention is applicable to vinyl chloride polymers as a class, and within this term are included both polyvinyl chloride and copolymers of vinyl chloride in a major proportion with other compounds, especially vinyl compounds, in a minor proportion by weight of the final resin. The vinyl chloride can be polymerized in bulk, in solution or as an emulsion of liquid vinyl chloride in water. While it is possible to polymerize the vinyl chloride in the presence of a primary plasticizer this usually is not done in commercial processes. The invention is applicable to both the pre-plasticized vinyl polymers prepared in this way and to the after-plasticized vinyl chloride polymers.

Typical vinyl compounds which can be used with vinyl chloride to form interpolymers to which the invention is applicable are vinyl acetate, vinylidene chloride, maleic and fumaric acids, lower allyl esters, acrylic esters, acrylonitrile, vinyl alkyl ethers, styrene, methylacrylate, 2-chloroallylacetate, isobutylene and isopropanol acetate. As exemplary of these copolymer materials there can be mentioned the following: VYCC Vinylite resin (62% vinyl chloride, 38% vinyl acetate), VYLF (87% vinyl chloride, 13% vinyl acetate), VMCH (86% vinyl chloride, 13% vinyl acetate), VAGH (91% vinyl chloride, 3% vinyl acetate), VYNS-3 (90% vinyl chloride, 10% vinyl acetate), VYDR (95% vinyl chloride, 5% vinyl acetate), interpolymers of vinyl chloride with 5 to 20% vinylidene chloride (the Geon 200 series and Plioflex), interpolymers of vinyl chloride with 10 to 20% diethyl fumarate or diethylmaleate (Luvimal M 20 and Mipolam) interpolymers of vinyl chloride and dimethylmaleate-diethylmaleate, 80%–10%–10% (Igelit MP–A and Pliovic A), interpolymers of vinyl chloride and methyl acrylate (80% vinyl chloride, 20% methylacrylate (Igelit MP, Vinoflex and Mipolam), tripolymers of vinyl chloride, vinylidene chloride and 2-ethylhexylacrylate (U. S. Patent No. 2,563,079), copolymers of vinyl chloride with ethyl acrylate (U. S. Patent No. 2,510,426), copolymers of vinyl chloride and butylacrylate and of vinyl chloride and octylacrylate (British Patent No. 487,593), copolymers of 45 to 80% vinyl chloride and 55 to 25% acrylonitrile (Vinyon N and Dynel), copolymers of vinyl chloride with vinyl-n-butyl and vinyl isobutyl ether (U. S. Patents Nos. 2,100,900 and 2,016,490, 76 to 97% vinyl chloride, Vinoflex MP 400), copolymers of vinyl chloride with styrene, copolymers of vinyl chloride with maleic anhydride, copolymers of vinyl chloride with 2-chlorallyl acetate, copolymers of vinyl chloride with isobutylene, copolymers of vinyl chloride with isopropenyl acetate, copolymers of vinyl chloride with 2-ethylhexyl allyl chloride, methallyl chloride and allyl acetate (U. S. Patent No. 2,066,330), copolymers of vinyl chloride with methoxyethyl vinyl ether (U. S. Patent No. 2,563,459), copolymers of vinyl chloride with vinyl bromide (U. S. Patent No. 2,361,504), copolymers of vinyl chloride with chlorotrifluoroethylene (Veloform F–10), copolymers of vinyl chloride with chloro-substituted butadienes such as 2,3-dichlorobutadiene and chloroprene, copolymers of vinyl chloride with trichloroethylene, copolymers of vinyl chloride with vinyl phenol and with vinyl carbazoles (British Patent No. 381,693).

After-chlorinated polyvinyl chloride also can be treated in accordance with the invention (Vinoflex, Igelit PC and Vinifol).

While the above copolymers can contain upwards of 50% chloride by weight of the copolymers, those having 85% vinyl chloride and more are preferred.

The molecular weight of the vinyl chloride polymer is not critical, and would be selected to produce a composition of the desired softening point after plasticization. The molecular orientation of the polymers is not critical. The polymers and copolymers can contain stabilizers against decomposition if desired; conventional stabilizers well known to the art can be used.

Vinyl polymers are plasticized by a number of primary plasticizers. The following table lists many of the plasticizers which have been used, with the properties imparted by each:

*Table 1*

| Type of plasticizer | General purpose | Low temperature flexibility | Non-migrating | Flame resistance |
|---|---|---|---|---|
| Phthalate esters: Dioctyl phthalates [1] (Good-rite GP 261, Flexol DOP, Ohio Apex DOP) | x | | | |
| Esters of straight-chain dibasic acids: | | | | |
| Dioctyl adipate (Good-rite GP 233, Adipol 2EH) | | x | | |
| Dioctyl sebacate (Monoplex DOS) | | x | | |
| Phosphate esters: | | | | |
| Tricresyl phosphate (Lindol, Kronites) | | | | x |
| Trioctyl phosphate (Flexol TOF) | | x | | x |
| Polymeric types: | | | | |
| Polypropylene glycol sebacate | | | x | |
| Polypropylene glycol adipate | | | x | |
| Butadiene-acrylonitrile copolymers | | | x | |

[1] Dioctyl phthalate refers to mixed esters of a number of 8 carbon alcohols such as 2-ethylhexyl alcohol, isooctyl alcohol, n-octyl alcohol and capryl alcohol.

Any of the above plasticizers can be used as the primary plasticizer in accordance with the instant invention.

Plasticizers ordinarily are incorporated in vinyl chloride polymers by mixing the powdered resin with the liquid plasticizer followed by mixing and/or kneading and then by curing the mix at an elevated temperature, for example, within the range from 150 to 200° C., on hot rolls or in a heated mixer such as a Werner-Pfleiderer or Banbury mixer. The amount of plasticizer employed will depend upon the initial properties of the resin and desired effect. Any amount of plasticizer will of course improve the pliability and elongation of the resin. Usually the total amount of plasticizer will be within the range from 15 to 70%, preferably from 30 to 60%, by weight of the entire composition.

In accordance with the invention this amount of plasticizer is made up partially of primary plasticizer and partially of a mono or dialkoxychlorobenzene or mixtures thereof. The alkoxychlorobenzene is incorporated in the vinyl resin at the same time as the primary plasticizer, and using the same procedure. In conjunction with the primary plasticizer the alkoxychlorobenzene also acts as a plasticizer and therefore the latter material can be used in substitution for a part of the primary plasticizer. Usually the alkoxychlorobenzene would be used in an amount up to but not exceeding the amount of primary plasticizer incorporated, but actually the upper limit of the amount of alkoxychlorobenzene is established only by its compatibility with the resin, and with the primary plasticizer. This will vary with the particular vinyl polymer and therefore exact limits cannot be established.

Any amount of the alkoxychlorobenzene will improve the flame resistance of the resin. In general, it can be said that amounts within the range from 5 to 65% by weight of the total plasticizer are practical, and preferably from 30 to 60%.

The following examples illustrate compositions coming within the limits of the invention.

The plasticizers (both primary and alkoxychlorobenzene) were incorporated with the powdered vinyl chloride polymer. The resin was cured for thirty minutes at an elevated temperature, usually 171° C. (340° F.), except when di-2-ethylhexyl sebacate was used as the primary plasticizer, in which case the curing time was extended to forty-five minutes. Three percent by weight of the resin of dibutyl tin dilaurate or dibutyl tin dimaleate was incorporated as a stabilizer (Advance Solvent and Chemical Corporation, No. 52 Heat Stabilizer).

The flame resistance of the compositions was tested by suspending approximately ten grams of the composition in a Bunsen burner flame for ten seconds using a pair of tweezers. The test piece was then taken out of the flame watched for one minute and the number of seconds the piece continued to burn noted. If the material burned for one minute or more it was marked "continued to burn after removal from flame." If the material did not burn or if the flame extinguished in ten seconds or less the material was considered flame-resistant.

Compatibility of the plasticizers was tested by noting whether plasticizer had been exuded or sweated after one week or one month.

The viscosities recorded were determined after mixing with plasticizer and before curing, and were estimated by observation and therefore are approximate only.

chlorobenzene and 7.6% of the dibutoxytetrachlorobenzene. The dibutoxytetrachlorobenzene was obtained in accordance with Example B and consisted of 82.8% of dibutoxytetrachlorobenzene and 17.2% monobutoxypentachlorobenzene. The monoethylhexoxypentachlorobenzene and triethylhexoxytrichlorobenzene were obtained according to the following procedure: 6 moles of hexachlorobenzene, 12 moles of sodium hydroxide, and 19.2 moles ethylhexyl alcohol were reacted for 2 hours following a preheating time of 0.7 hour. When reacted at a temperature of 175°–191.5° C. the product contained 66.8% triethylhexoxytrichlorobenzene and 33.2% of diethylhexoxytetrachlorobenzene, and when reacted at 139°–152° C. the product contained 90.8% monoethylhexoxypentachlorobenzene and 9.2% diethylhexoxytetrachlorobenzene.

The following conclusions can be drawn from the above data. Monobutoxypentachlorobenzene, dibutoxytetrachlorobenzene, and 2-ethylhexoxypentachlorobenzene, the alkoxychlorobenzenes tested, when used alone are not compatible with the vinyl resin (Controls A, B and C). Di-(2-ethylhexyl) phthalate, tri-(2-ethylhexyl) phosphate and 2,2-(ethylhexanamido) diethyl di-(2-ethylhexanoate) alone do not give good flame-resistance (Controls I, II and III). When however, these alkoxychlorobenzenes and primary plasticizers are used together in the same total amounts, the mixture is compatible with the resin and the flame resistance is considerably improved (Examples 1 to 12).

These results are to be contrasted with those for an alkoxychlorobenzene not in accordance with the invention, Table 2

| Example number | Percent plasticizer (by weight of the composition) | | Viscosity (centipoises) | | Exuding | | | Flame test |
|---|---|---|---|---|---|---|---|---|
| | Primary plasticizer | Alkoxychlorobenzene | At start | After 1 month | At start | After 1 week | After 1 month | |
| Control A | | 60% butoxypentachloro | 12,000 | | Excessive | | | Failed to form a satisfactory resin. |
| Control B | | 60% dibutoxytetrachloro | 12,000 | | do | | | Do. |
| Control C | | 60% ethylhexoxypentachloro | 12,000 | | do | | | Do. |
| Control I | 60% DOP | | 1,000 | 1,000 | None | | None | Continued to burn after removal from flame. |
| 1 | 30% DOP | 30% butoxypentachloro | 1,200 | 1,200 | do | | do | Burned 6 seconds. |
| 2 | 24% DOP | 36% butoxypentachloro | 1,200 | 2,000 | do | | do | Burned less than 1 second. |
| 3 | 20% DOP, 20% MO | 20% butoxypentachloro | 800 | | do | None | do | Extinguished in 22 seconds. |
| Control II | 60% TOF | | 1,000 | | do | | do | Extinguished in 21 seconds. |
| 4 | 30% TOF | 30% butoxypentachloro | 1,000 | | do | | do | Extinguished in 1½ seconds. |
| 5 | 30% TOF | 30% dibutoxytetrachloro | 1,000 | | do | | do | Extinguished in 2 seconds. |
| 6 | 30% TOF | 30% ethylhexoxypentachloro | 1,000 | | do | | do | Extinguished in 1 second. |
| 7 | 30% TOF | 30% triethylhexoxytrichloro | 1,000 | | Soft and waxy | Slight | Slight | Failed to form a satisfactory resin. |
| 8 | 40% TOF | 20% ethylhexoxypentachloro | 700 | | None | None | None | Extinguished in 1 second. |
| 9 | 20% TOF, 20% DOP | 20% butoxypentachloro | 1,000 | | do | do | do | Do. |
| 10 | 20% DOP, 20% TOF | 20% ethylhexoxypentachloro | 1,000 | | do | do | do | Extinguished in 2½ seconds. |
| Control III | 60% 8N8 | | 1,200 | | do | do | do | Continued to burn. |
| 11 | 30% 8N8 | 30% butoxypentachloro | 1,000 | | do | do | do | Extinguished in 5 seconds. |
| 12 | 30% 8N8 | 30% triethylhexoxytrichloro | 1,200 | | Soft and waxy | | | Failed to form a satisfactory resin. |
| Control IV | 60% lindol | | 1,500 | | None | None | None | Extinguished in 1 second. |
| 13 | 30% lindol | 30% butoxypentachloro | 1,200 | | do | do | do | Extinguished immediately. |
| 14 | do | 30% dibutoxytetrachloro | 1,400 | | do | do | do | Do. |
| 15 | do | 30% ethylhexoxypentachloro | 1,400 | | do | Trace | Trace | Do. |
| 16 | 20% lindol, 20% DOP | 20% butoxypentachloro | 1,200 | | do | None | None | Extinguished in ½ second. |
| 17 | 40% lindol | 20% ethylhexoxypentachloro | 1,200 | | do | do | do | Extinguished immediately. |
| 18 | 20% lindol, 20% DOP | 20% ethylhexoxypentachloro | 1,000 | | do | do | do | Do. |

DOP=di-(2-ethylhexyl) phthalate.
TOF=tri-(2-ethylhexyl) phosphate.
MO=di-(2-ethylhexyl) sebacate.
Lindol=tricresyl phosphate.
8N8=2,2-(2-ethylhexanamido) diethyl di-(2-ethylhexanoate).

In the above examples the vinyl polymer used was Geon No. 121 polyvinyl chloride resin, a white resin having a specific gravity of 1.40, maximum ash content 0.35%, specific viscosity 0.57 to 0.63, and maximum moisture content 0.7%. The monobutoxypentachlorobenzene used in the above examples are prepared in accordance with Example A and consisted of 92.4% of the monobutoxypentatriethylhexoxytrichlorobenzene, which was not compatible with the vinyl resin even in combination with the primary plasticizer, and failed to form a satisfactory resin (Examples 7 and 12).

The volatility of several compositions selected from the above group was determined using the SPI test method, with the following results:

Table 3

| Example number | Plasticizer content | Percent loss (after 24 hrs. at 70° C.) |
|---|---|---|
| Control I | 60% DOP | 0.85 |
| 1 | 30% DOP and 30% butoxypentachlorobenzene. | 0.74 |
| Control II | 60% TOF | 0.35 |
| 4 | 30% TOF and 30% butoxypentachlorobenzene. | 0.41 |
| 5 | 30% TOF and 30% dibutoxytetrachlorobenzene. | 0.19 |
| 6 | 30% TOF and 30% ethylhexoxypentachlorobenzene. | 0.16 |

It is evident that the volatility is reduced compared to the controls in all of the compositions tested, except Example 4, and even this is not appreciably greater; the butoxypentachlorobenzene is the most volatile of the alkoxychlorobenzenes tested.

The compositions in accordance with the invention can be utilized for electric wire and cable coverings, floorings, pliable thin sheetings and film finishes for textiles. They can also be used in the preparation of plastosols, plastigels and organosols, i. e., vinyl chloride polymer plasticizer pastes without volatile and with volatile solvents.

All percentages are by weight.

We claim:

1. A plasticized vinyl chloride polymer containing a major proportion of polymerized vinyl chloride and comprising an alkoxychlorobenzene in an amount compatible with and improving the flame-resistance of the resin composition and having the formula

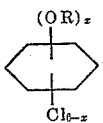

where R is an alkyl radical having from four to eight carbon atoms and $x$ is selected from the group consisting of one and two.

2. A plasticized vinyl chloride polymer in accordance with claim 1 plasticized with an organic phosphoric acid ester.

3. A plasticized vinyl chloride polymer in accordance with claim 1 plasticized with a phthalic acid alkyl ester.

4. A plasticized vinyl chloride polymer in accordance with claim 1 plasticized with an alkyl ester of an aliphatic dicarboxylic acid.

5. A plasticized vinyl chloride polymer in accordance with claim 1 plasticized with 2,2-(2-ethylhexanamido)diethyl di-(2-ethylhexanoate).

6. A plasticized vinyl chloride polymer in accordance with claim 1 in which the alkoxychlorobenzene is monobutoxypentachlorobenzene.

7. A plasticized vinyl chloride polymer in accordance with claim 1 in which the alkoxychlorobenzene is dibutoxytetrachlorobenzene.

8. A plasticized vinyl chloride polymer in accordance with claim 1 in which the alkoxychlorobenzene is ethylhexoxypentachlorobenzene.

9. A plasticized vinyl chloride polymer in accordance with claim 1 in which the alkoxychlorobenzene is a mixture of monobutoxypentachlorobenzene and dibutoxytetrachlorobenzene.

10. A plasticized vinyl chloride polymer in accordance with claim 1 in which the vinyl polymer is polyvinyl chloride.

11. A plasticized vinyl chloride polymer in accordance with claim 1 in which the vinyl polymer is a copolymer of vinyl chloride and another vinyl compound copolymerizable therewith.

12. A plasticized vinyl chloride polymer in accordance with claim 1 in which the vinyl polymer is a copolymer of at least 85% vinyl chloride and not over 15% of another vinyl compound copolymerizable therewith.

13. A plasticized vinyl polymer in accordance with claim 12 in which the vinyl polymer is a copolymer of at least 85% vinyl chloride and not over 15% of vinylidene chloride.

14. A plasticized vinyl polymer in accordance with claim 12 in which the vinyl polymer is a copolymer of at least 85% vinyl chloride and not over 15% of vinyl acetate.

15. A plasticized copolymer of at least 85% vinyl chloride and not over 15% vinyl acetate comprising dioctylphthalate and monobutoxypentachlorobenzene.

16. A plasticized copolymer of at least 85% vinyl chloride and not over 15% vinyl acetate comprising trioctylphosphate and monobutoxypentachlorobenzene.

17. A plasticized copolymer of at least 85% vinyl chloride and not over 15% vinyl acetate comprising tricresyl phosphate and monobutoxypentachlorobenzene.

18. A plasticized copolymer of at least 85% vinyl chloride and not over 15% vinyl acetate comprising a phosphate ester and dibutoxytetrachlorobenzene.

References Cited in the file of this patent

UNITED STATES PATENTS

| 2,564,214 | Ross et al. | Aug. 14, 1951 |
| 2,578,853 | Stevenson | Dec. 18, 1951 |

OTHER REFERENCES

Industrial and Engineering Chemistry, by H. L. Fisher, volume 31, No. 8, pages 941–945.

Hackh's "Chemical Dictionary," 3rd edition, McGraw-Hill Book Co. Inc., page 295, 1944.